United States Patent
Maki-Ontto et al.

(10) Patent No.: US 9,901,980 B2
(45) Date of Patent: Feb. 27, 2018

(54) CASTING TECHNOLOGY FOR INDUCTION ROTOR ASSEMBLIES

(71) Applicant: Ingersoll-Rand Company, Davidson, NC (US)

(72) Inventors: Petri Juhani Maki-Ontto, Espoo (FI); Fredrik Andreas Boxberg, Espoo (FI)

(73) Assignee: Ingersoll-Rand Company, Davidson, NC (US)

( * ) Notice: Subject to any disclaimer, the term of this patent is extended or adjusted under 35 U.S.C. 154(b) by 638 days.

(21) Appl. No.: 14/537,727

(22) Filed: Nov. 10, 2014

(65) Prior Publication Data
US 2015/0130321 A1    May 14, 2015

Related U.S. Application Data

(60) Provisional application No. 61/901,539, filed on Nov. 8, 2013.

(51) Int. Cl.
*H02K 15/02* (2006.01)
*H02K 17/16* (2006.01)
(Continued)

(52) U.S. Cl.
CPC ..... *B22D 19/0054* (2013.01); *H02K 15/0012* (2013.01); *H02K 17/165* (2013.01); *B22D 17/00* (2013.01)

(58) Field of Classification Search
CPC .... H02K 15/00; H02K 15/0012; H02K 15/02; H02K 15/10; H02K 17/00; H02K 17/16;
(Continued)

(56) References Cited

U.S. PATENT DOCUMENTS

| 1,762,017 A | 6/1930 | Grenzer |
| 3,134,040 A * | 5/1964 | Barth ................. H02K 17/165 |
| | | 310/166 |

(Continued)

FOREIGN PATENT DOCUMENTS

| DE | 102009018951 A1 | 11/2010 |
| JP | S5970170 A | 4/1984 |

(Continued)

OTHER PUBLICATIONS

International Search Report and Written Opinion, PCT/US2014/064870, dated Feb. 13, 2015.

(Continued)

*Primary Examiner* — Tran Nguyen
(74) *Attorney, Agent, or Firm* — Taft Stettinius & Hollister LLP

(57) ABSTRACT

An induction rotor assembly having an induction cage that is formed using a combination of liquid and solid materials. The first and second end plates of the induction cage may be fabricated before the casting of the conductors of the induction cage. According to certain embodiments, the first and second end plates may be assembled with first and second molds and a rotor core to form a casting assembly. A liquid casting material may be injected into the casting assembly, wherein the liquid casting material may solidify within one or more core passageways of the rotor core, thereby forming the conductors of the induction cage. The first and second end plates may also include flow channels that may be configured to facilitate the flow of the liquid casting material in the casting assembly, and increase the area of contact between the liquid casting material, when solidified, and the end plates.

19 Claims, 8 Drawing Sheets

(51) Int. Cl.
*B22D 19/00* (2006.01)
*H02K 15/00* (2006.01)
*B22D 17/00* (2006.01)

(58) Field of Classification Search
CPC ........ H02K 17/165; H02K 17/02; B22C 9/08; B22C 9/22; B22D 19/00; B22D 19/04; B22D 19/0054; B22D 29/00
USPC ............ 310/211–212; 39/596–598, 732–736
See application file for complete search history.

(56) References Cited

U.S. PATENT DOCUMENTS

| | | | |
|---|---|---|---|
| 5,444,319 | A | 8/1995 | Nakamura et al. |
| 5,467,521 | A | 11/1995 | Nakamura et al. |
| 8,587,174 | B2 | 11/2013 | Gerard et al. |
| 8,631,559 | B2 | 1/2014 | Meyer et al. |
| 8,701,270 | B2 | 4/2014 | Wang et al. |
| 8,720,041 | B2 | 5/2014 | Meyer et al. |
| 2007/0205686 | A1 | 9/2007 | Ishida |
| 2010/0243197 | A1 | 9/2010 | Osborne et al. |
| 2011/0284138 | A1 | 11/2011 | Walker et al. |
| 2013/0291373 | A1* | 11/2013 | Meyer ................ H02K 15/0012 29/598 |

FOREIGN PATENT DOCUMENTS

| | | | |
|---|---|---|---|
| JP | 07227067 | A | 8/1995 |
| JP | 10314916 | A | 12/1998 |
| JP | 2953990 | B2 | 9/1999 |
| JP | 2005333743 | A | 12/2005 |
| JP | 2009124879 | A * | 6/2009 |

OTHER PUBLICATIONS

European Patent Office Extended EP Search Report dated Jul. 13, 2016 cited in counterpart EP Patent Application No. 14860824.3 (8 pages).

* cited by examiner

CASTING TECHNOLOGY FOR INDUCTION ROTOR ASSEMBLIES

CROSS REFERENCE TO RELATED APPLICATIONS

The present application claims the benefit of U.S. Provisional Patent Application Ser. No. 61/901,539, filed Nov. 8, 2013, which is incorporated herein by reference in its entirety.

BACKGROUND

Embodiments of the present invention generally relate to the manufacturing of an electric motor. More particularly, but not exclusively, embodiments of the present invention relate to casting processes for manufacturing induction rotor assemblies for electric motors.

Due to at least the shape of rotor cores and the associated molds, conventional processes for casting induction rotor assemblies for electric motors often encounter a number of relatively significant challenges. For example, casting errors, including errors relating to gas porosity, shrinkage, and fills, is not uncommon in both the casted end plates and the casted conductors of the induction cage. Such casting errors often arise as a result of the relatively complex flow path of the high-pressure injection material and the consequent splashing within the to-be-cast volume. Further, such casting errors may be detrimental to the performance of the resulting rotor assembly. For example, casting errors may adversely impact the electrical conductivity, thermal conductivity, and/or mechanical strength of at least a portion, if not the entirety, of the rotor assembly. Additionally, casting errors may adversely impact the ability to produce a well-balanced rotor assembly.

BRIEF SUMMARY

An aspect of the present invention is a method that includes pressing a pre-fabricated first end plate of an induction cage for an induction rotor assembly against a first end of a rotor core. The method also includes pressing a pre-fabricated second end plate of the induction cage against a second end of the rotor core and injecting, via at least one or more flow channels of the pre-fabricated first end plate, a liquid casting material into one or more core passageways of the rotor core. Additionally, the liquid casting material is adapted to solidify as one or more electrically conductive conductors of the induction cage.

Another aspect of the present invention is a method that includes positioning a first mold about a first end plate of an induction cage to form a first assembly portion, and positioning a second mold about a second end plate of the induction cage to form a second assembly portion. Additionally, at least a portion of the first and second assembly portions are pressed against opposing ends of a rotor core to form a casting assembly. Liquid casting material is injected into the casting assembly, at least a portion of the liquid casting material being adapted to solidify within the rotor core to form a plurality of conductors of the induction cage.

Another aspect of the present invention is an apparatus that includes a rotor core having a plurality of core passageways and an induction cage of an induction rotor assembly. The induction cage includes a plurality of conductors, a pre-fabricated first end plate, and a pre-fabricated second end plate. The plurality of conductors are an electronically conductive casted material that is casted within the plurality of core passageways and within one or more flow channels of the pre-fabricated first and second end plates.

BRIEF DESCRIPTION OF THE DRAWINGS

The description herein makes reference to the accompanying figures wherein like reference numerals refer to like parts throughout the several views.

Figure 1:
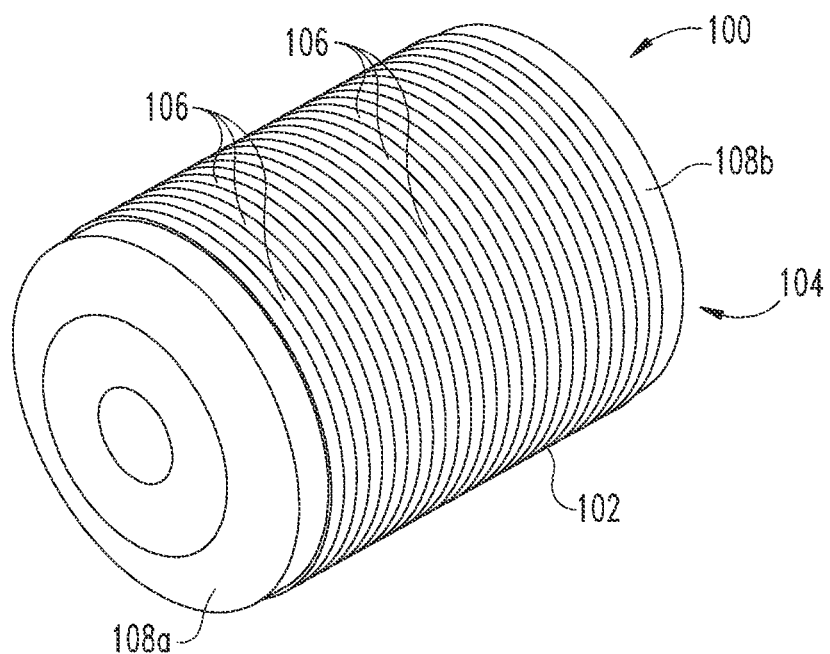
FIG. 1 illustrates a perspective view of an induction rotor assembly that is constructed utilizing processes of embodiments of the present invention.

The foregoing summary, as well as the following detailed description of certain embodiments of the present invention, will be better understood when read in conjunction with the appended drawings. For purposes of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

Figure 2:
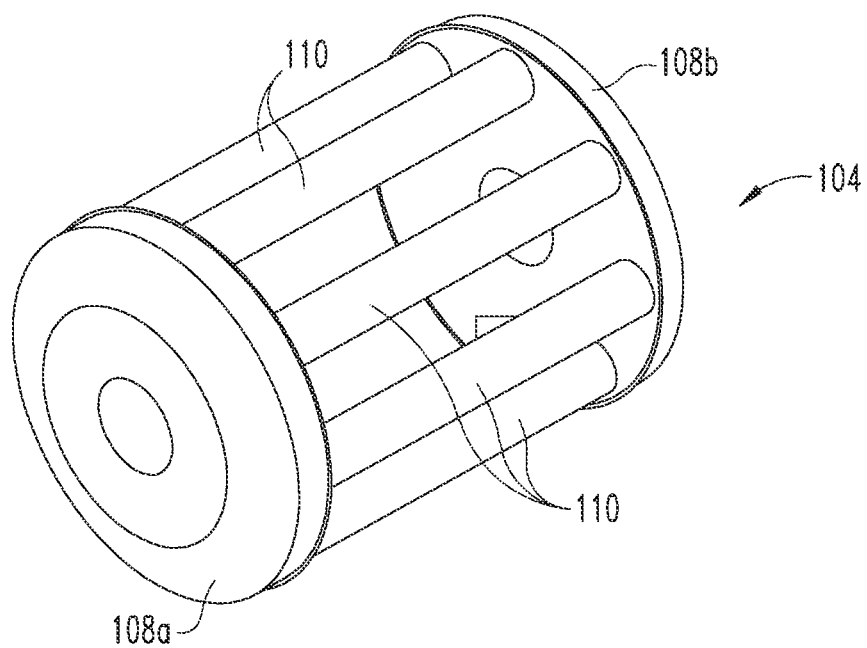
FIG. 2 illustrates a perspective view of an exemplary induction cage for the induction rotor assembly shown in FIG. 1.

FIG. 1 illustrates a perspective view of an exemplary induction rotor assembly 100 that is constructed utilizing processes of embodiments of the present invention. The induction rotor assembly 100 may include a rotor core 102 and an induction cage 104. According to certain embodiments, the rotor core 102 may be constructed from a plurality of stacked sheets 106 of electrically conductive material, such as, for example, steel, among other materials. As shown in FIGS. 1 and 2, the induction cage 104 may include first and second end plates 108a, 108b and a plurality of conductors 110. As discussed below, at least a portion of the conductors 110 may be casted within core passageways within the rotor core 102, and may extend between at least the opposing first and second end plates 108a, 108b.

According to the illustrated embodiment, the induction cage 104 may be formed using a combination of liquid and solid materials. For example, according to certain embodiments, the first and second end plates 108a, 108b may be pre-fabricated solid components that are joined together, at least in part, by the casting of a liquid casting material, which, when solidified, forms the plurality of conductors 110. Use of such a combination of solid and liquid materials during the formation of the induction cage 104, and the associated formation of the induction rotor assembly 100, may improve the ease at which the liquid casting material may flow through the casting assembly, or otherwise simplify the flow path for the liquid casting material, and thereby reduce the propensity for the formation or occurrence of casting errors along the flow path of the liquid casting material. Further, the pre-fabrication of the first and second end plates 108a, 108b may allow the first and second end plates 108a, 108b to be fabricated in a controlled manner prior to the casting of the conductors 110 that prevents, or eliminates, the formation of casting errors in the first and second end plates 108a, 108b. Alternatively, such pre-fabrication of the first and second end plates 108a, 108b may allow for the first and second end plates 108a, 108b to be machined from existing materials, rather than be formed via casting. Pre-fabricating the first and second end plates 108a, 108b in a manner that does not involve simultaneously casting the conductors 110 may also increase the number of options for the types of materials that may be used for the first and second end plates 108a, 108b. Further, regardless of whether the first and second end plates 108a, 108b are pre-fabricated by a separate casting operation, or via machining, the first and second end plates 108a, 108b may be pre-fabricated from a variety of different materials, such as, for example, wrought metals or aluminum, among other materials. Further, according to certain embodiments, the liquid casting material may be a liquid metal, such as, for example, aluminum or an aluminum alloy, among other materials that will solidify as an electrically conductive material at least within the rotor core 102.

Figure 3:
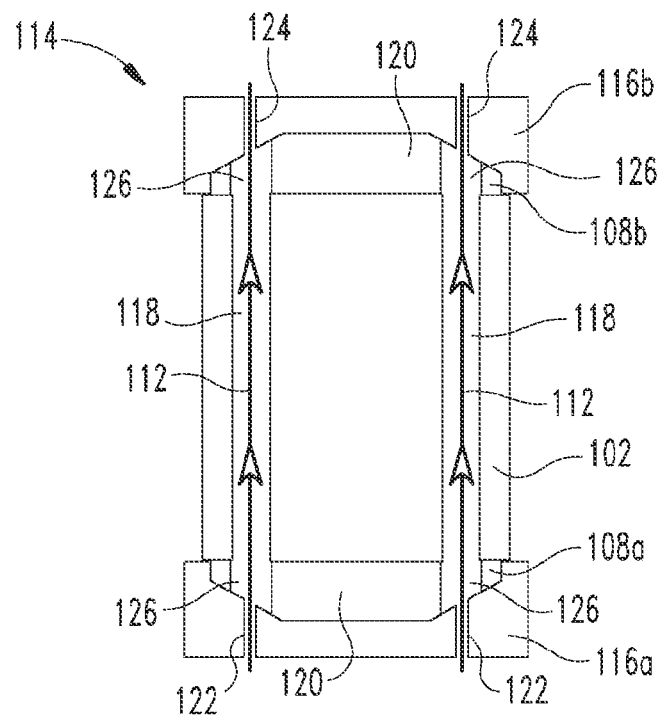
FIG. 3 is a schematic illustrating the flow of a liquid casting material in a casting assembly according to an illustrated embodiment of the present invention.

FIG. 3 is a schematic illustrating the flow of a liquid casting material 112 in a casting assembly 114 according to an illustrated embodiment of the present invention. As shown, the casting assembly 114 may include the assembled rotor core 102, the pre-fabricated first and second end plates 108a, 108b, and first and second molds 116a, 116b. The plurality of sheets 106 used to form the rotor core 102 may include a plurality of apertures that, when aligned with adjacent sheets 106 of the rotor core 102, provide the rotor core 102 with one or more rotor core passageways 118. The rotor core passageways 118 are adapted to receive at least a portion of the liquid casting material 112 that is injected into the casting assembly 114. Moreover, the injected liquid casting material 112 that subsequently solidifies within each of the rotor core passageways 118 may provide at least a portion of the conductors 110 of the induction cage 104.

According to certain embodiments, the first and second molds 116a, 116b may both include a recess 120 that is adapted to receive the insertion of at least a portion of the adjacent first and second end plates 108a, 108b, as shown in FIG. 3. Further, the first mold 116a may include a plurality of inlet apertures 122 that are adapted to receive the injection or insertion of the liquid casting material 112. Similarly, the second mold 116b may include one or more outlet apertures 124 that are adapted to receive the flow of at least a portion of the injected liquid casting material 112, if any, and/or to release from the casting assembly 114 at least a portion of the gases from within the casting assembly 114 that may be displaced by the injected liquid casting material 112.

The first and second end plates 108a, 108b may be fabricated to include one or more flow channels 126 that are adapted to receive the passage, and solidification, of at least at least a portion of the injection liquid casting material 112. As illustrated by at least FIGS. 3 and 4A-4C, the flow channels 126 may have a variety of different shapes and sizes. The shapes and sizes selected for the flow channels 126 may be based on a variety of criteria. For example, the flow channels 126 may be configured to facilitate to the flow of the liquid casting material 112 in the casting assembly 114, and thereby at least attempt to assist in minimizing, or eliminating, the formation of casting errors. Additionally, for example, the flow channels 126 may be configured to enhance the contact between the solidified casting material 112 and the corresponding end plate 108a, 108b. For example, by properly heating the end plates 108a, 108b, such as, for example, via the heat of the liquid casting material 112 that is received in the flow channels 126, it may be possible to form a local melting or welding connection between the end plates 108a, 108b and the subsequently solidified casting material 112. Additionally, the size and/or shape of the flow channels 126 may enhance the size of the area of the end plates 108a, 108b that is in contact with the subsequently solidified casting material 112 and/or enhance a mechanical connection between the solidified casting material 112 and the end plates 108a, 108b. Further, the flow channels 126 may be shaped to obtain an advantageous compression of the rotor core 102 during the solidification and the subsequent thermal shrinkage of the casting material 112.

Figure 4A:
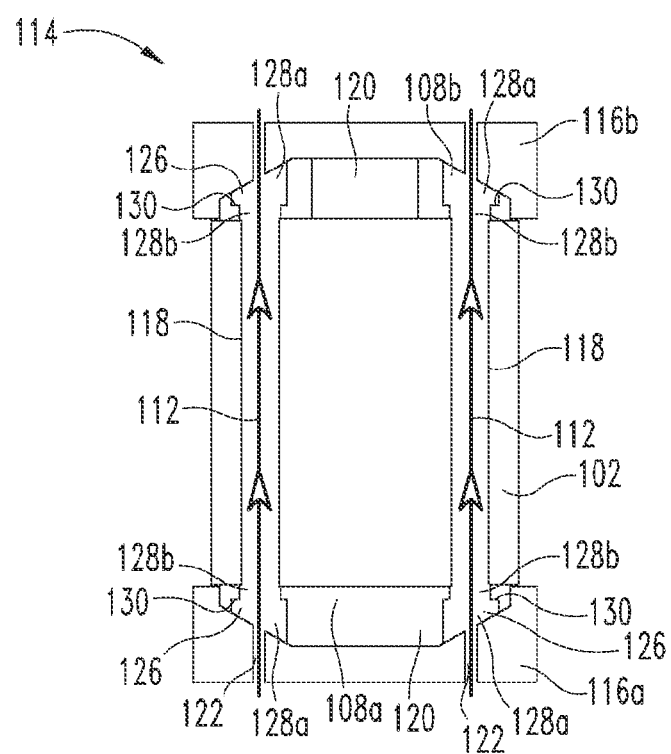
FIGS. 4A-4C illustrates various configurations of flow channels of pre-fabricated first and second end plates according to an illustrated embodiment of the present invention.
Figure 4B:
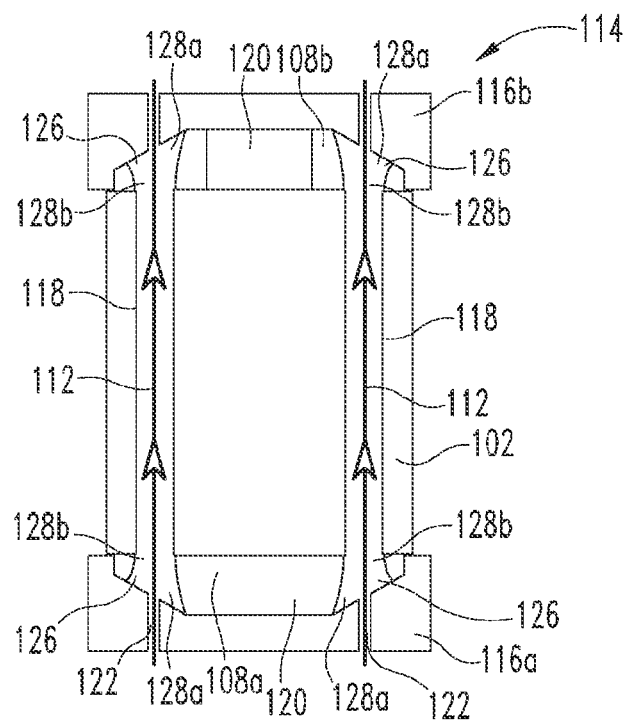

For example, as shown by at least FIGS. 4A and 4B, according to certain embodiments, the flow channels 126 may have a first region 128a and a different sized and/or shaped second region 128b. More specifically, for example, in the embodiment shown in FIG. 3A, the first and second regions 128a, 128b may be similarly shaped, but have different sizes, such as, for example, different diameters or widths. In such an embodiment, the differences in sizes may allow for the formation of lips or ledges 130 that may increase the area of contact between the casting material and the associated end plate 108a, 108b, and which may at least assist in the mechanical connection or locking between the first end plate 108a, the conductors 110, and/or the second end plate 108b. Further, the surfaces provided by the lips or ledges 130 may further assist in providing a surface against which the solidification and the subsequent thermal shrinkage of the liquid casting material 112 may exert a compressive force against the end plates 108a, 108b, and thus the rotor core 102. Similar advantages may also be obtained by the different shapes and sizes of the tapered and un-tapered first and second regions 128a, 128b, respectively, of the flow channels 126 illustrated in FIG. 4B.

Figure 4C:
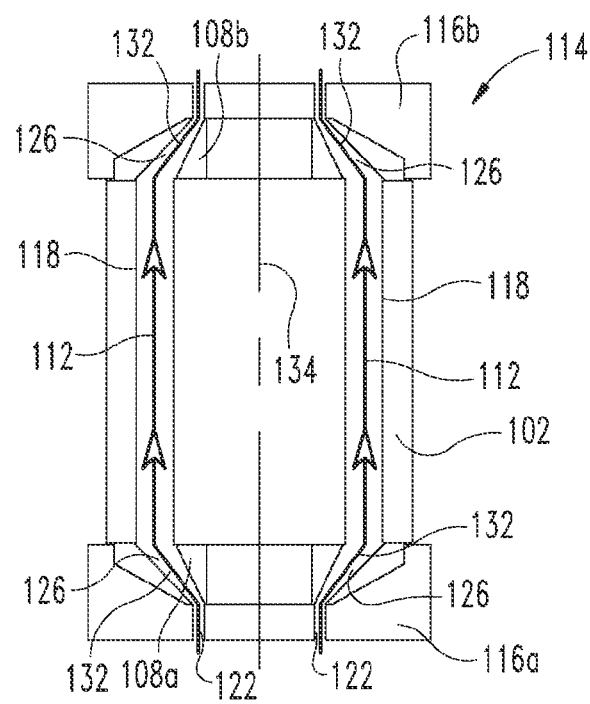

FIG. 4C illustrates a configuration for the flow channels 126 in which the flow channels 126 extend along a central axis 132 that is not parallel to the longitudinal axis 134 of the induction rotor assembly 100. According to certain embodiments, the longitudinal axis 134 of the induction rotor assembly 100 may be generally parallel to similar longitudinal axes of the core passageways 118 and/or the first and second end plates 108a, 108b. Further, the flow channels 126 shown in FIG. 4C may have a tapered or angled configuration that change the diameter or width of the flow channels 126 along a length of each of the flow channels 126. Such a configuration may at least enhance the area of contact between the solidified casting material and the casting material, as well as provide an orientation that facilitates the exertion of compressive force between the end plates 108a, 108b and/or the rotor core 102 during the solidification and the subsequent thermal shrinkage of the casting material 112. Further, the shape and orientation of the flow channels 126 in the embodiment shown in FIG. 4C may also at least assist in providing a relatively secure mechanical connection or locking between the first end plate 108a, the conductors 110, and/or the second end plate 108b.

Figure 5:
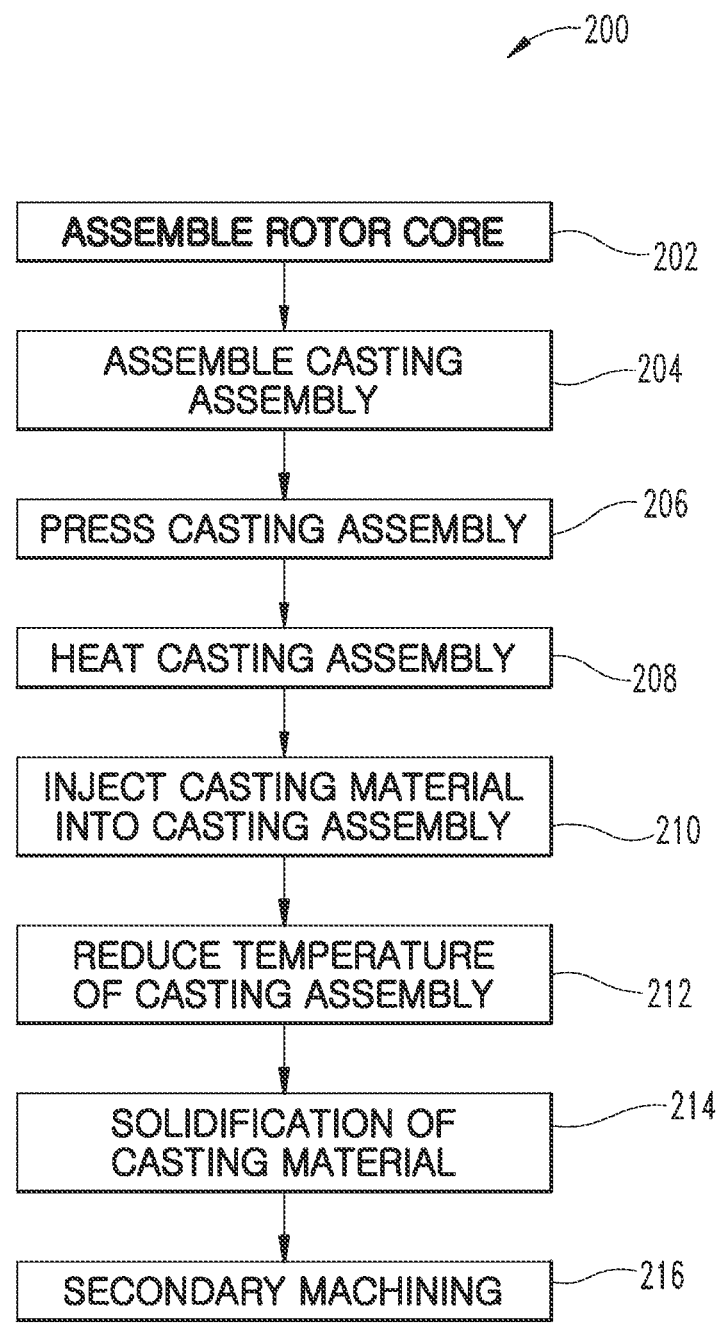
FIG. 5 illustrates a flow chart of a process for forming an induction rotor assembly according to an illustrated embodiment of the present invention.

FIG. 5 illustrates a flow chart of a process 200 for one step casting of an induction rotor assembly 100 according to an illustrated embodiment of the present invention. The steps illustrated herein are understood to be exemplary only, and steps may be combined or divided, and added or removed, as well as re-ordered in whole or in part.

At step 202, the rotor core 102 may be assembled. For example, as previously discussed, according to certain embodiments, the rotor core 102 may be assembled by forming a stack from a plurality of electrically conductive steel sheets 106. As shown in at least FIG. 3, according to certain embodiments, the plurality of electrically conductive steel sheets 106 may be arranged to provide the rotor core 102 with a plurality of core passageways 118. And as also previously discussed, each of the plurality of core passageways 118 may provide a space for the formation of at least one conductor of the plurality of conductors 110.

Figure 6A:
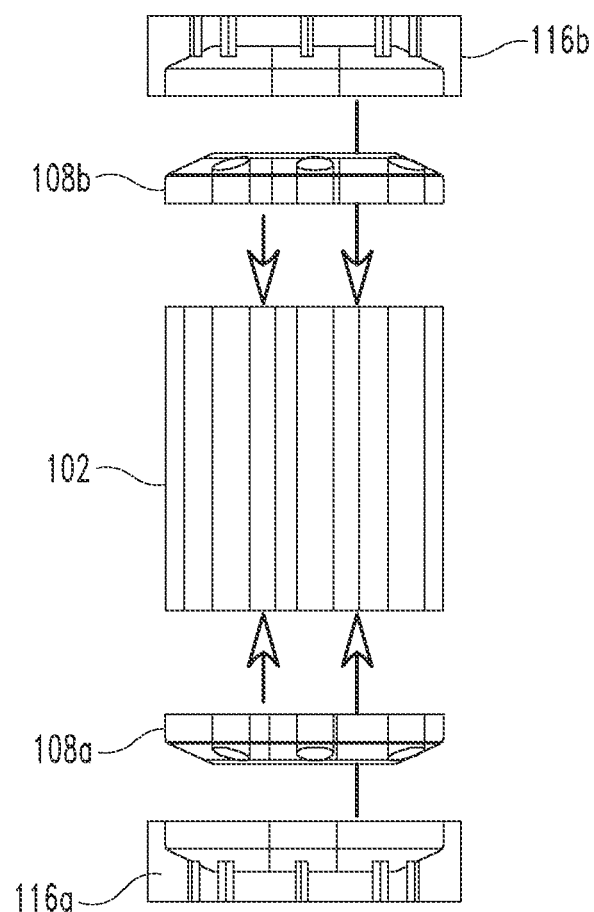
FIGS. 6A-6F graphically demonstrate a process for forming an induction rotor assembly according to an illustrated embodiment of the present invention.
Figure 6B:
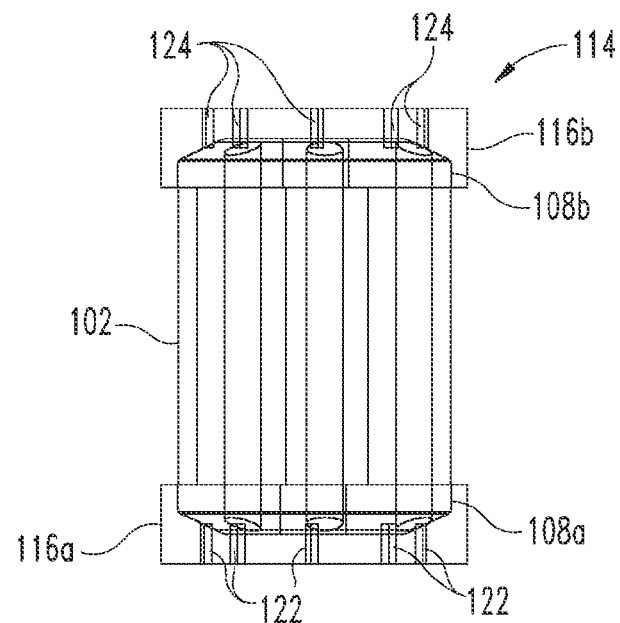

At step 204, the casting assembly 114 may be assembled or otherwise joined together, as shown for example, in at least FIGS. 3 and 6B. Referencing FIGS. 3 and 6A, the casting assembly 114 may include the plurality of stacked electric sheets 106 that form the rotor core 102, the first and second end plates 108a, 108b, and the first and second molds 116a, 116b. Further, the casting assembly 114 may be assembled such that at least each inlet aperture 122 of the first mold 116a is in fluid communication with an outlet aperture 124 of the second mold 116b. Moreover, each inlet aperture 122 and each flow channel 126 of the first end plate 108a may be positioned to be in fluid communication with at least one core passageway 118 of the rotor core 102. Similarly, each core passageway 118 may also be in fluid communication with at least one flow channel 126 in the second end plate 108b, which in turn is in fluid communication with at least one of the plurality of outlet apertures 124 of the second mold 116b. Further, the inlet aperture 122 of the first mold 116a may be adapted to receive, or otherwise be coupled to, a tool or implement that injects the liquid casting material 112 into the casting assembly 114 via the inlet aperture 122.

At step 206, the assembly of the casting assembly 114 may be pressed together, or otherwise subjected to a compressive force. For example, according to certain embodiments, one or more compressive forces may be exerted against the first and/or second molds 116a, 116b such that the first and/or second end plates 108a, 108b are pressed against opposing ends of the rotor core 102. At step 208, one or more components of the casting assembly 114 may be heated, such as, for example, by the temperature(s) of at least certain components of the casting assembly 114 being elevated to a temperature(s) that may facilitate the flow of the liquid casting material 112 in the casting assembly 114.

Figure 6C:
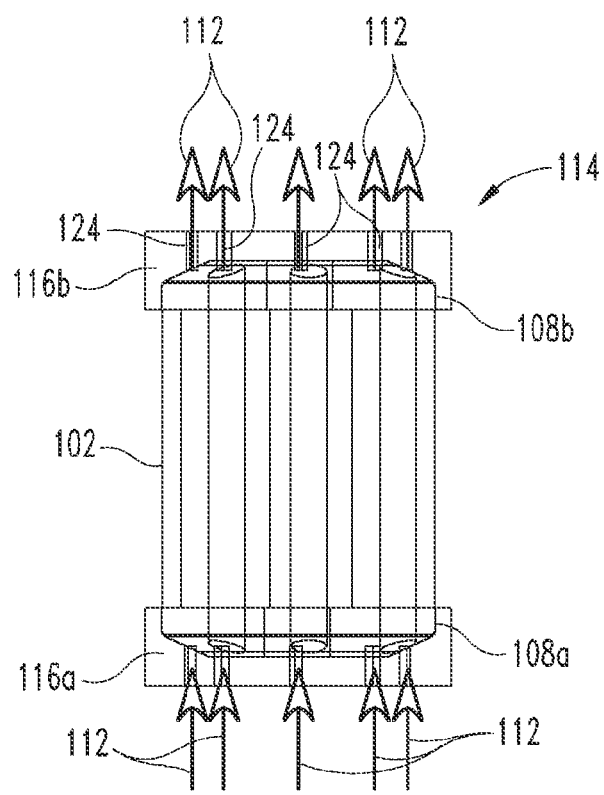
Figure 6D:
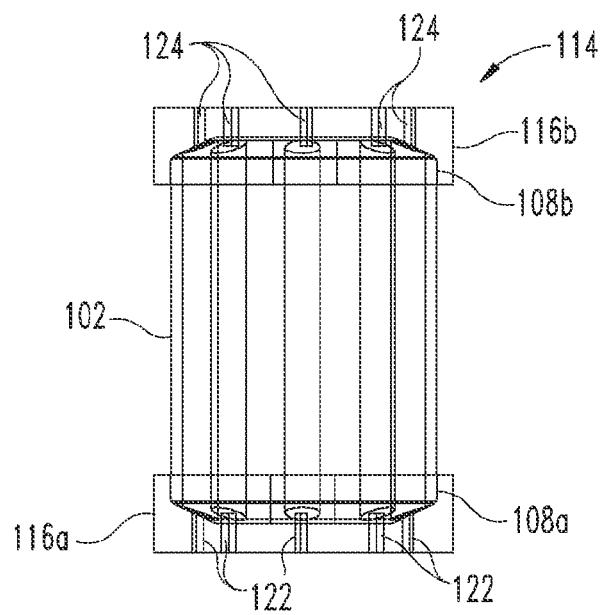

At step 210, liquid casting material 112, such as, for example, liquid metal, may be injected into one or more of the inlet apertures 122 of the first mold 116a, as depicted in at least FIGS. 3 and 6C. Injected liquid casting material 112 may then flow from the inlet apertures 122 and into corresponding flow channels 126 in the first end plate 108a, before flowing to the core passageways 118, the flow channels 126 in the second end plate 108b, and the outlet apertures 124 of the second mold 116b. Then, at step 212, the temperature of at least a portion of the casting assembly 114 may be reduced so as to at least assist in reducing the temperature of the liquid casting material 112 in the casting assembly 114 until the liquid casting material 112 solidifies, as graphically represented by FIG. 6D. Again, as the liquid casting material 112 in the core passageways 118 solidifies to form at least a portion of the conductors 110 of the induction rotor assembly 100, the shrinkage associated with the solidification of the casting material 112 may result in at least the first and second end plates 108a, 108b exerting a compressive force on the rotor core 102.

Figure 6E:
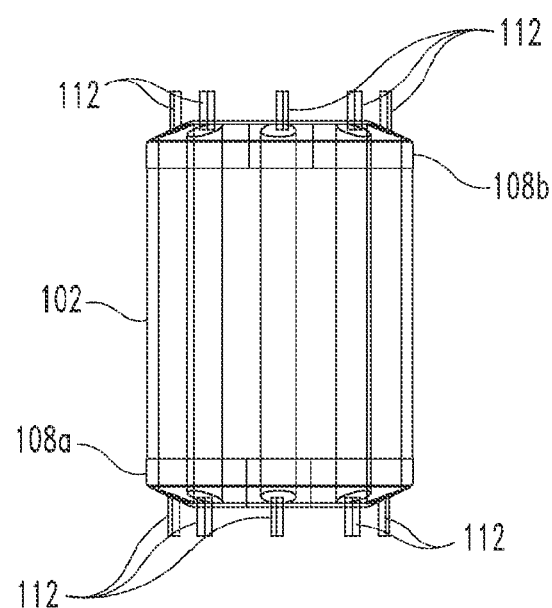
Figure 6F:
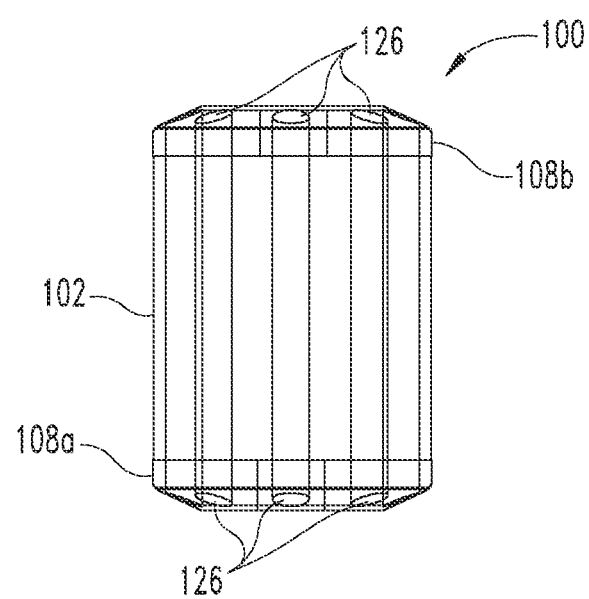

At step 214, with the liquid casting material 112 solidified, the first and second molds 116a, 116b may be released from engagement with at least the first and second end plates 108a, 108b, respectively, as graphically represented by FIG. 6E, thereby providing a manufactured induction rotor assembly 100, as shown in FIGS. 1 and 6F. Optionally, at step 216, the resulting induction rotor assembly 100 may undergo one or more secondary machining processes. For example, according to certain embodiments, after removal of the first and second molds 116a, 116b, the induction rotor assembly 100 may undergo machining to remove casting material 112 that may have solidified on, and/or extends beyond, exterior portions of the first and second end plates 108a, 108b, as shown in FIG. 6E, among other machining operations.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A method comprising:
   pressing a pre-fabricated first end plate of an induction cage for an induction rotor assembly against a first end of a rotor core;
   pressing a pre-fabricated second end plate of the induction cage against a second end of the rotor core;
   wherein the pre-fabricated first and second end plates extend across substantially the entire cross-sectional area of the respective ends of the induction cage;
   injecting, via at least one or more flow channels of the pre-fabricated first end plate, a liquid casting material into one or more core passageways of the rotor core, the liquid casting material adapted to solidify in direct contact with the pre-fabricated first and second end plates as one or more electrically conductive conductors of the induction cage; and
   wherein the at least one or more flow channels include a first region having a first size in the core passageway and a second region having a second size in each of the first and second end plates, the second size being greater than the first size to increase a contact area between the cast material and the pre-fabricated first and second end plates.

2. The method of claim 1, wherein the injected liquid casting material is a liquid metal, and wherein the pre-fabricated first and second end plates are pieces of electrically conductive metal.

3. The method of claim 2, further including
injecting, via the flow of liquid casting material through the one or more core passageways, the liquid casting material into one or more flow channels of the pre-fabricated second end plate.

4. The method of claim 3, further including the step of assembling the rotor core from a plurality of stackable sheets of an electrically conductive material.

5. The method of claim 4, further including the step of positioning a first mold about at least a portion of the pre-fabricated first end plate, and wherein the step of injecting the liquid casting material into the one or more flow channels of the pre-fabricated first end plate includes the delivery of the liquid casting material to the first end plate through one or more inlet apertures of the first mold.

6. The method of claim 1, wherein the step of injecting the liquid casting material into the one or more flow channels of the pre-fabricated first end plate includes injecting the liquid casting material at a casting material temperature that facilitates a local melting or welding connection between the pre-fabricated first and second end plates and the liquid casting material, when solidified.

7. A method comprising:
positioning a first mold about a first end plate of an induction cage to form a first assembly portion, wherein the first end plate substantially covers one end of the induction cage;
positioning a second mold about a second end plate of the induction cage to form a second assembly portion, wherein the second end plate substantially covers an opposing end of the induction cage;
pressing at least a portion of the first and second assembly portions against opposing ends of a rotor core to form a casting assembly;
injecting a liquid casting material into the casting assembly, at least a portion of the liquid casting material adapted to solidify in direct contact with the pre-fabricated first and second end plates within the rotor core to form a plurality of conductors of the induction cage; and
wherein the conductors are defined by a first size through portions of the induction cage and a second size through portions of the first and second end plates, the second size being greater than the first size.

8. The method of claim 7, wherein the injected liquid casting material is a liquid metal, and wherein the first end and second end plates are pre-fabricated pieces of electrically conductive metal.

9. The method of claim 8, wherein the rotor core comprises a plurality of sheets of electrically conductive material, wherein each sheet of the plurality of sheets has at least one aperture, and wherein the at least one aperture for each sheet of the plurality of sheets is aligned with the at least one aperture of an adjacent sheet of the plurality of sheets to form the one or more core passageways.

10. The method of claim 9, wherein the step of injecting the liquid casting material into the casting assembly includes injecting the liquid casting material into the one or more core passageways of the rotor core.

11. The method of claim 10, wherein the liquid metal is at least one of an aluminum and an aluminum alloy, and wherein the first and second end plates are a wrought metal.

12. The method of claim 11, further including the step of cooling a temperature of the rotor core to facilitate solidification of the injected liquid casting material.

13. The method of claim 12, wherein the step of injecting a liquid casting material into the casting assembly includes injecting the liquid casting material at a casting material temperature that facilitates a local melting or welding connection between the first and second end plates and the liquid casting material when the liquid casting material solidifies.

14. The method of claim 13, wherein the step of injecting the liquid casting material into the casting assembly includes injecting the liquid casting material into one or more flow channels of the first end plate, and wherein the one or more flow channels include a first region and a second region, the first region having a different size than the second region.

15. An apparatus comprising:
a rotor core having a plurality of core passageways;
an induction cage of an induction rotor assembly, the induction cage having a plurality of conductors, a pre-fabricated first end plate positioned across one end of the rotor core, and a pre-fabricated second end plate positioned across an opposing end of the rotor core, the plurality of conductors being an electrically conductive material that is cast within the plurality of core passageways and within one or more flow channels of the pre-fabricated first and second end plates such that the cast material solidifies in direct contact with the pre-fabricated first and second end plates; and
wherein each of the plurality of conductors are defined by a first size through portions of the induction cage and a second size through portions of the first and second end plates, the second size being greater than the first size.

16. The apparatus of claim 15, wherein the pre-fabricated first and second end plates are pieces of electrically conductive metal that are adapted to receive operable placement of at least a portion of the electrically conductive casted material of the plurality of conductors.

17. The apparatus of claim 16, wherein the plurality of conductors are cast from a liquid metal of at least one of an aluminum and an aluminum alloy, and wherein the pre-fabricated first and second end plates are a wrought metal.

18. The apparatus of claim 17, wherein the plurality of flow channels of the pre-fabricated first and second end plates include a first region and a second region, the first region having a different size than the second region.

19. The apparatus of claim 17, wherein each of the plurality of flow channels of the pre-fabricated first and second end plates have a central axis along which each of the plurality of flow channels extend, the central axis not being parallel to a longitudinal axis of the plurality of core passageways.

* * * * *